United States Patent
Shen et al.

(10) Patent No.: US 11,419,259 B2
(45) Date of Patent: Aug. 23, 2022

(54) DIRECTIONAL GARLIC SEED THROWING MECHANISM AND CONTROL METHOD OF THE SAME

(71) Applicants: SHANDONG ACADEMY AGRICULTURAL MACHINERY SCIENCES, Shandong (CN); Shandong University, Shandong (CN)

(72) Inventors: Jingxin Shen, Shandong (CN); Yitian Sun, Shandong (CN); Yongjia Sun, Shandong (CN); Gang Chen, Shandong (CN); Qing Long Li, Shandong (CN); Xian Ying Feng, Shandong (CN); Jun Zhou, Shandong (CN); Peng Yan, Shandong (CN)

(73) Assignees: SHANDONG ACADEMY AGRICULTURAL MACHINERY SCIENCES, Shandong (CN); Shandong University, Shandong (CN)

( * ) Notice: Subject to any disclaimer, the term of this patent is extended or adjusted under 35 U.S.C. 154(b) by 369 days.

(21) Appl. No.: 16/629,034

(22) PCT Filed: Sep. 19, 2018

(86) PCT No.: PCT/CN2018/106372
§ 371 (c)(1),
(2) Date: Jan. 7, 2020

(87) PCT Pub. No.: WO2020/037749
PCT Pub. Date: Feb. 27, 2020

(65) Prior Publication Data
US 2021/0029868 A1 Feb. 4, 2021

(30) Foreign Application Priority Data
Aug. 22, 2018 (CN) .......................... 201810958748.0

(51) Int. Cl.
*A01C 7/16* (2006.01)
*A01C 14/00* (2006.01)
(Continued)

(52) U.S. Cl.
CPC .................. *A01C 7/16* (2013.01); *A01C 7/04* (2013.01); *A01C 7/105* (2013.01); *A01C 14/00* (2013.01)

(58) Field of Classification Search
CPC .. A01C 7/04; A01C 7/105; A01C 7/16; A01C 9/08; A01C 14/00
See application file for complete search history.

(56) References Cited

U.S. PATENT DOCUMENTS

2003/0084830 A1   5/2003  Choi et al.
2007/0207485 A1*  9/2007  Deppermann ........... G01N 1/04
                                                435/6.12
2019/0223372 A1*  7/2019  Koch ..................... A01C 7/046

FOREIGN PATENT DOCUMENTS

CN     102487634    6/2012
CN     104160811   11/2014
(Continued)

OTHER PUBLICATIONS

"International Search Report (Form PCT/ISA/210) of PCT/CN2018/106372," dated May 22, 2019, pp. 1-5.
(Continued)

*Primary Examiner* — Thomas B Will
*Assistant Examiner* — Ian A Normile
(74) *Attorney, Agent, or Firm* — JCIP Global Inc.

(57) ABSTRACT

A directional garlic seed throwing mechanism includes a base, a rotating device, a vision sensor, a seed throwing guide plate, a seed guide pipe and a plurality of bulbil adjusting devices. The rotating device includes a rotating motor detachably connected to the base and a turntable
(Continued)

connected to an output end of the rotating motor. The seed throwing guide plate is arranged on the turntable to enable garlic seeds of seed containing bowls to fall into the seed guide pipe. The seed guide pipe has an upper port right below the bulbil adjusting devices and arranged on the base. An even number of the bulbil adjusting devices are fixed on the turntable uniformly and symmetrically and include the seed containing bowls and bulbil direction control devices for driving the bowls to rotate 180 degrees.

7 Claims, 4 Drawing Sheets

(51) Int. Cl.
*A01C 7/04* (2006.01)
*A01C 7/10* (2006.01)

(56) References Cited

FOREIGN PATENT DOCUMENTS

| | | | | |
|---|---|---|---|---|
| CN | 104541929 | | 4/2015 | |
| CN | 103733776 | | 7/2015 | |
| CN | 205105599 | | 3/2016 | |
| CN | 106068830 | | 11/2016 | |
| CN | 106105516 | | 11/2016 | |
| CN | 105103723 | | 1/2017 | |
| CN | 106973590 | | 7/2017 | |
| CN | 107535145 | | 1/2018 | |
| CN | 108156899 | | 6/2018 | |
| CN | 108260385 | * | 7/2018 | ............... A01C 9/08 |
| CN | 108496485 | | 9/2018 | |
| CN | 108575216 | | 9/2018 | |
| CN | 108668569 | | 10/2018 | |
| CN | 108848806 | | 11/2018 | |
| CN | 208063750 | | 11/2018 | |
| CN | 208258386 | | 12/2018 | |
| CN | 208273557 | | 12/2018 | |
| CN | 208624087 | | 3/2019 | |
| JP | 2017521747 | * | 8/2017 | ............... A01C 1/04 |
| KR | 20180010962 | | 1/2018 | |

OTHER PUBLICATIONS

Wei Yuzhen, et al., "Method Inquisition of Garlic Bud Screening and Upright Planting," Journal of Agricultural Mechanization Research, Oct. 2017, pp. 113-118.

Xu Tao, et al., "Study on Related Traits for Mechanical Planting of Garlic Seeds," Journal of Agricultural Mechanization Research, May 2018, pp. 137-141.

Guo Yingfang, "Research of the Recognition Method of Garlic Direction in Planting Machinery", Department of Agricultural Electrization and Automation, Northwest A&F University, Sep. 2011, pp. 1-50.

Jin Chengqian, et al., "Experimental study on effects of the bulbil direction on garlic growth," Transactions of the Chinese Society of Agricultural Engineering, vol. 24, Apr. 2008, pp. 155-158.

Li Xiaoyu, et al., "Design and experiment of full-automatic lifting and releasing device of garlic seed box," Transactions of the Chinese Society of Agricultural Engineering, vol. 33, Dec. 2017, pp. 32-37.

Cui Rongjiang, et al., "Discussion on the Present Situation and Development of Garlic Mechanized Production in China," Journal of Agricultural Mechanization Research, Mar. 2015, pp. 264-268.

Guo Yingfang, et al., "Research on the Identification of the Roots of Garlic Based on SUSAN Algorithm," Journal of Yangling Vocational & Technical College, vol. 10, Sep. 2011, pp. 1-4.

Yang Qingming, et al., "Direction identification of garlic seeds based on image processing," Acta Agriculturae Zhejiangensis, Jan. 2010, pp. 119-123.

Yang Qingming, "Design of Garlic Planting Sorting Machine Based on Image Processing", Department of Agricultural Mechanization Engineering, Nanjing Agricultural University, Jun. 2010, pp. 1-91.

Han Qiuyan, et al., "Design Research of Plug-hole Automatic Orientation Garlic Planting Machine," Journal of Agricultural Mechanization Research, Jul. 2016, pp. 172-175.

Zhao Liqing, et al.,"The Application of the Intelligent Mechanical Arm in the Planting of Garlic," Journal of Agricultural Mechanization Research, Aug. 2014, pp. 104-110.

\* cited by examiner

DIRECTIONAL GARLIC SEED THROWING MECHANISM AND CONTROL METHOD OF THE SAME

CROSS-REFERENCE TO RELATED APPLICATION

This application is a 371 of international application of PCT application serial no. PCT/CN2018/106372, filed on Sep. 19, 2018, which claims the priority benefit of China application no. 201810958748.0, filed on Aug. 22, 2018. The entirety of each of the above mentioned patent applications is hereby incorporated by reference herein and made a part of this specification.

BACKGROUND

Technical Field

The present disclosure relates to a part of a garlic seeder, in particular to a directional garlic seed throwing mechanism and a control method of the same, and belongs to the technical field of agricultural machinery.

Description of Related Art

According to the agronomic requirements of garlic sowing, bulbils need to be upwards planted during garlic sowing. An existing garlic sowing technology in China does not fully solve the problem of how to control roots of the bulbils to be downward in a garlic planting process and the bulbils to be upright after seed throwing, resulting in the fact that the garlic sowing can only be manually done for a long time and then causing problems of high labor intensity, low production efficiency, time waste, labor waste, high production cost and the like; and as a result, the mechanical production of the garlic sowing is severely restricted.

SUMMARY

In order to overcome the above shortcomings in the prior art, the present disclosure provides a directional garlic seed throwing mechanism and a control method thereof, and designs results and technical parameters of the directional garlic seed throwing mechanism, so that directional seed throwing with garlic bulbils oriented upwards may be realized, and a foundation is laid for replacing manual garlic sowing with mechanical operation.

The present disclosure is realized by the following technical solution.

A directional garlic seed throwing mechanism includes a base, a rotating device, a vision sensor, a seed throwing guide plate, a seed guide pipe and a plurality of bulbil adjusting devices. The rotating device includes a rotating motor and a turntable. The rotating motor is detachably connected to the base. An output end of the rotating motor is connected with the turntable. An even number of the bulbil adjusting devices are provided and fixedly mounted on the turntable uniformly and symmetrically. The bulbil adjusting devices include seed containing bowls and bulbil direction control devices used for driving the seed containing bowls to rotate 180 degrees. An upper port of the seed guide pipe is located right below the bulbil adjusting devices and arranged on the base. The seed throwing guide plate is arranged on the turntable, such that garlic seeds of the seed containing bowls fall into the seed guide pipe.

According to the preferred solution of the directional garlic seed throwing mechanism, the bulbil direction control device includes a cam device and a rotary guide device. The cam device includes a cam, a sliding rod and a roller. A driving end of the sliding rod is provided with the roller and abuts against a curved surface of the cam. A resetting device for driving the roller on the sliding rod to abut against the cam is arranged on a mounting seat. The rotary guide device is arranged on the mounting seat and moves along a curve of a surface of the sliding rod to drive the sliding rod to rotate. A seed containing device is arranged above the resetting device and connected with the sliding rod. Each of the bulbil adjusting devices further includes an electromagnet for enabling operation of the cam device. The electromagnet is detachably connected below a support which is fixedly connected to the base. A reinforcing plate is arranged between the support and the base.

According to the preferred solution of the directional garlic seed throwing mechanism, the rotary guide device includes a fixed seat, a vertical rod and a cantilever shaft. The fixed seat is detachably connected with the base. Two ends of the vertical rod are respectively connected with the fixed seat and the cantilever shaft. A bearing is mounted at a tail end of the cantilever shaft, and is matched with a guide groove on a surface of the sliding rod.

According to the preferred solution of the directional garlic seed throwing mechanism, the resetting device includes a pressure spring, a linear bearing and a flange plate. The linear bearing is connected with the fixed seat, and is in sliding connection with the sliding rod. The flange plate is arranged at an upper end of the sliding rod and connected with a bottom portion of the seed containing device. The pressure spring is disposed about the sliding rod. One end of the pressure spring is in contact with the flange plate, and the other end of the pressure spring is in contact with the linear bearing.

According to the preferred solution of the directional garlic seed throwing mechanism, the seed throwing guide plate is welded and connected with the base, and a longitudinal central surface of the seed throwing guide plate faces a center of circle of the turntable and tangential to rotation of the rotating motor.

According to the preferred solution of the directional garlic seed throwing mechanism, the mechanism further includes a controller. The controller is respectively connected with a touch display screen, the vision sensor, the electromagnets, the rotating motor and a speed sensor.

A control method of the directional garlic seed throwing mechanism includes following steps.

(1) Inputting a seed spacing of garlic sowing through a touch display screen.

(2) Pressing a confirm button to display a working interface by the touch display screen.

(3) Reading, by the controller, a speed of the speed sensor, and simultaneously calculating a rotating speed and an action time interval of the rotating motor according to the set seed spacing.

(4) In a rotating process of the rotating motor, detecting, by a position sensor, a position of a bulbil adjusting mechanism, wherein when the bulbil adjusting mechanism is detected, the rotating motor stops working, and at this moment, the bulbil adjusting devices for receiving garlic seeds rotate to a position below a vision sensor, and the vision sensor acquires garlic seed image information.

(5) Analyzing, by the controller, the garlic seed image information, and determining a garlic bulbil direction.

(6) Driving, by the rotating motor, the bulbil adjusting devices to rotate.

(7) When the garlic bulbil direction is consistent with a desired direction, electromagnets does not work, and when the garlic bulbil direction is opposite to the desired direction, controlling, by the controller, the electromagnets to operate such that the bulbil adjusting devices rotate 180 degrees to complete adjustment of the bulbil direction.

(8) Driving, by the rotating motor, the bulbil adjusting devices to rotate to a seed throwing position, and driving the seed containing bowls to tilt under an action of the seed throwing guide plate to enable the garlic seeds to slide into the seed guide pipe under an action of the gravity and then slide into an indenting tool having a duck-bill shape by keeping the bulbil direction upward under restriction of the seed guide pipe, and completing directional seed throwing.

The working principle of the present disclosure is as follows.

The directional garlic seed throwing mechanism realizes detection through a plurality of sensors, and adjusts the sequential matching work of each component through the controller to realize directional garlic seed throwing. The visual sensor acquires the garlic bulbil image information, and the controller analyzes and judges the garlic bulb image information. If the garlic bulbil direction is consistent with the desired direction, the garlic bulbil direction is not adjusted. If the garlic bulbil direction is inconsistent with the desired direction, the electromagnets act to adjust the garlic bulbil direction, and then directional seed throwing is completed under the guidance of the guide plate.

The present disclosure has the advantages below.

1. The garlic bulbil direction control device may adjust the garlic bulbil direction as required, and the seed throwing guide plate enables the garlic seeds of the seed containing bowls to fall into the seed guide pipe; therefore, without complicated power mechanism, the directional garlic seed throwing mechanism is simple in structure, high in practicability, convenient and reliable to use, applicable to garlic sowing machinery, capable of remarkably improving the accuracy of controlling bulbils upwards during mechanical garlic sowing and capable of improving the operation quality of the garlic sowing machinery.

2. The controller analyzes and processes the garlic seed image information acquired by the vision sensor, so that the garlic bulbil direction may be accurately distinguished, and the recognition is accurate and reliable. The vision sensor acquires the garlic seed image information, and may analyze the image to determine operation conditions such as lack of seeds and re-sowing to improve the sowing quality. The controller analyzes the garlic seed image, counts the garlic seeds, monitors a sowing process, and provides a reliable scientific basis for monitoring and analyzing the operation quality. The controller coordinates and drives the various components and adjusts the consistency of the garlic bulbil directions to realize sowing work with consistent garlic bulbil directions and improve the operation quality of the mechanical garlic sowing. The touch display screen displays operation parameters such as a current operation speed, a working area and the quantity of seeds, and parameters such as the seed spacing are set through the touch display screen, thus realizing human-machine interaction and improving the operation quality and the intelligence level of the whole mechanism.

BRIEF DESCRIPTION OF THE DRAWINGS

The accompanying drawings provide further understandings of the present disclosure, and constitute one part of the description. The drawings are used for interpreting the present disclosure together with the embodiments of the present disclosure, not for limiting the present disclosure.

DESCRIPTION OF THE EMBODIMENTS

The preferred embodiments of the present disclosure will be explained in details below with reference to the accompanying drawings. It should be understood that the preferred embodiments described herein are merely to illustrate and explain the present disclosure, not to limit the present disclosure.

Figure 1:
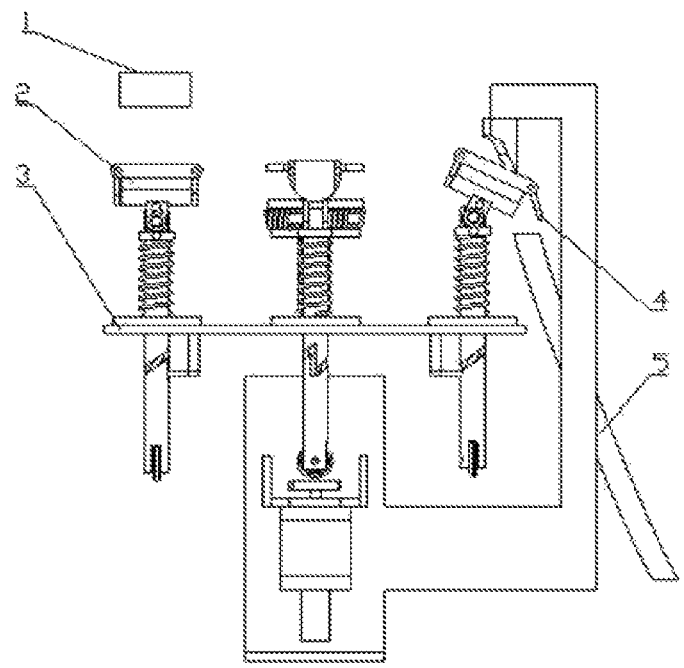
FIG. 1 is a front view of the present disclosure.
Figure 2:
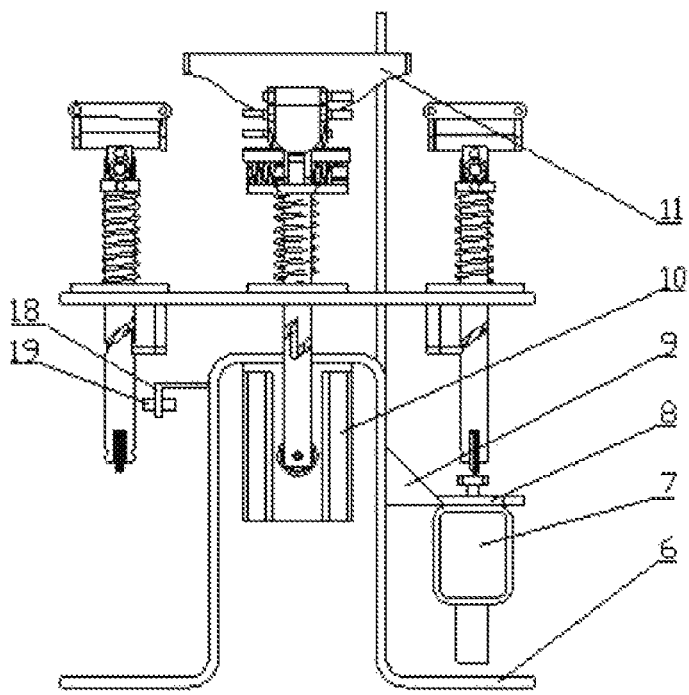
FIG. 2 is a left view of the present disclosure.
Figure 3:
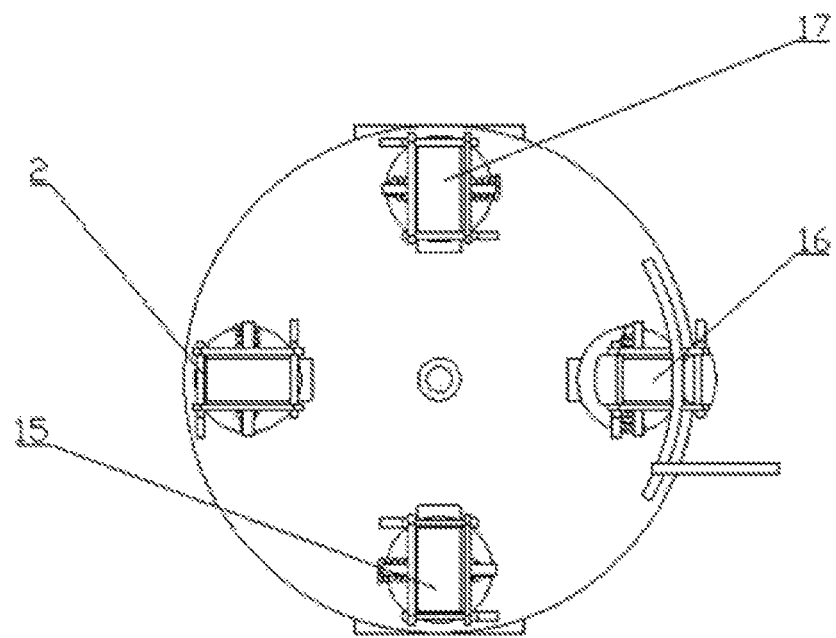
FIG. 3 is a top view of the present disclosure.

Referring to FIG. 1, FIG. 2 and FIG. 3, a directional garlic seed throwing mechanism includes a base 6, a rotating device, a vision sensor 1, a seed throwing guide plate 11, a seed guide pipe 5 and a plurality of bulbil adjusting devices. The rotating device includes a rotating motor 10 and a turntable 3. The rotating motor 10 is detachably connected to the base 6. An output end of the rotating motor 10 is connected with the turntable 3. There are four bulbil adjusting devices, which are respectively a first bulbil adjusting mechanism 17, a second bulbil adjusting mechanism 2, a third bulbil adjusting mechanism 15 and a fourth bulbil adjusting mechanism 16 and fixedly mounted on the turntable 3 uniformly and symmetrically. The bulbil adjusting devices include seed containing bowls and bulbil direction control devices used for driving the seed containing bowls to rotate 180 degrees. An upper port of the seed guide pipe 5 is located right below the bulbil adjusting devices and arranged on the base 6. The seed throwing guide plate 11 is arranged on the on the base 6, so that garlic seeds in the seed containing bowls fall into the seed guide pipe 5.

Figure 5:
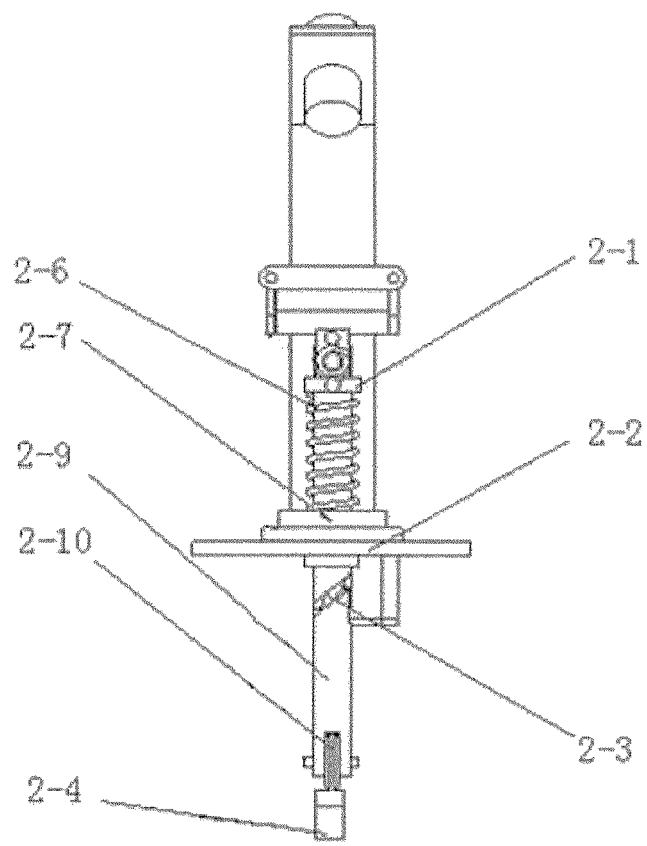
FIG. 5 is a schematic structural diagram of a bulbil adjusting device.
Figure 6:
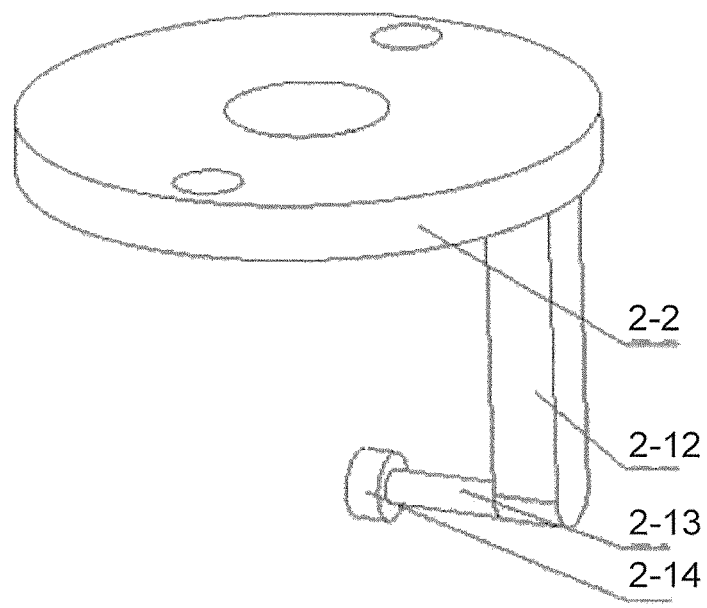
FIG. 6 is a schematic structural diagram of a rotary guide device.

Referring to FIG. 5 and FIG. 6, the bulbil direction control device includes a cam device and a rotary guide device. The cam device includes a cam 2-4, a sliding rod 2-9 and a roller 2-10. A driving end of the sliding rod 2-9 is provided with the roller 2-10 and abuts against a curved surface of the cam 2-4. A resetting device for driving the roller 2-10 on the sliding rod 2-9 to abut against the cam 2-4 is arranged on a mounting seat. The rotary guide device is arranged on the mounting seat and moves along a curve of a surface of the sliding rod 2-9 to drive the sliding rod 2-9 to rotate. A seed containing device is arranged above the resetting device and connected with the sliding rod 2-9. The bulbil adjusting device further includes an electromagnet 7 for enabling operation of the cam device. The electromagnet 7 is detachably connected below a support 8 which is fixedly connected to the base 6. A reinforcing plate 9 is arranged between the support 8 and the base 6. The rotary guide device includes a fixed seat 2-2, a vertical rod 2-12 and a cantilever shaft 2-13. The fixed seat 2-2 is detachably connected with the base 6. Two ends of the vertical rod 2-12 are respectively connected with the fixed seat 2-2 and the cantilever shaft 2-13. A bearing 2-14 is mounted at a tail end of the cantilever shaft 2-13, and is matched with a guide groove 2-3 on the surface of the sliding rod 2-9. The resetting device includes a pressure spring 2-6, a linear bearing 2-7 and a flange plate 2-1. The linear bearing 2-7 is connected with the fixed seat 2-2, and is in sliding connection with the sliding rod 2-9. The flange plate 2-1 is arranged at an upper end of the sliding rod 2-9 and connected with a bottom portion of the seed containing device. The pressure spring 6 is disposed about the sliding rod 2-9. One end of the pressure spring 6 is in contact with the flange plate 2-1, and the other end of the pressure spring 2-6 is in contact with the linear bearing 2-7.

In the present embodiment, the seed throwing guide plate 11 is welded and connected with the base 6, and a longitudinal central surface of the seed throwing guide plate 11 faces the circle center of the turntable 3 and tangential to the rotation of the rotating motor 10.

Figure 7:
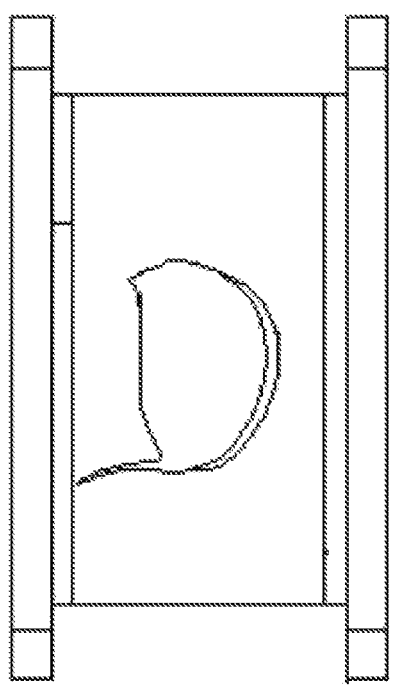
FIG. 7 is a schematic top view of a seed containing bowl.

Referring to FIG. 1, FIG. 2 and FIG. 7, each of the seed containing bowls includes a front surface, a back surface and a bottom surface. The front surface and the back surface are planar surfaces, and the bottom surface is of an arc-shaped structure having openings in left and right sides. The left and right sides of the seed containing bowl are rotatably connected with baffle plates 4 through baffle plate pin shafts. A torsional spring is arranged below the seed containing bowl.

Figure 4:
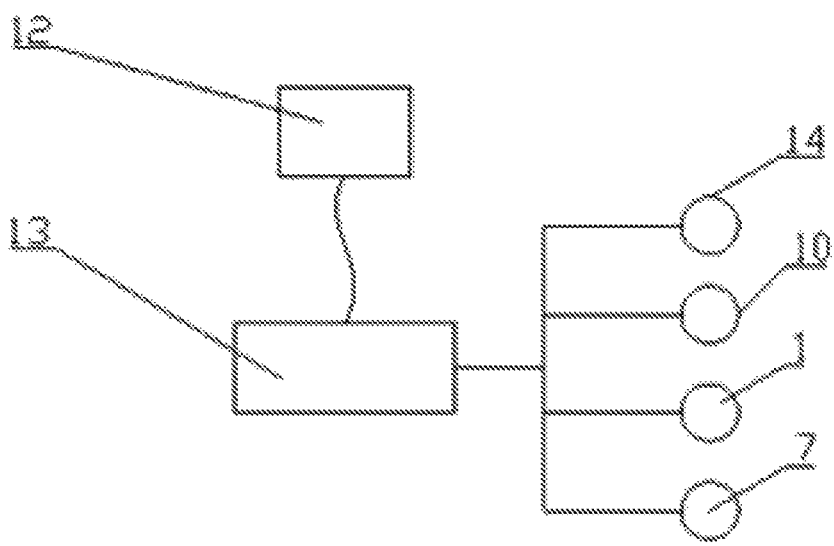
FIG. 4 is a schematic structural diagram of a control system of the present disclosure.

Referring to FIG. 4, the present embodiment thither includes a controller 13. The controller 13 is respectively connected with a touch display screen 12, the vision sensor 1 the electromagnets 7, the rotating motor 10 and a speed sensor 14. The touch display screen 12 may set a seed spacing of garlic sowing and display information such as an operation speed, an operation area and the quantity of seeds, and is convenient for an operator to monitor the operation process and quality. The speed sensor 14 detects an operation speed. The controller 13 receives speed information and a seed spacing signal and automatically calculates and controls a rotating speed and an action time interval of the rotating motor 10, so as to guarantee the seed spacing consistency under different operation speeds. The controller 13 uses a DSP (Digital Signal Processing) chip as a control unit for calculation and processing. A serial port, which complies with the Recommended Standard 232 (RS-232) standard of the touch display screen 12 is connected with the controller. The vision sensor 1 is a CMOS (Complementary Metal-Oxide-Semiconductor Transistor) image sensor to supplement how to connect the rotating motor 10 with the controller 13.

The controller 13 drives the rotating motor 10 to rotate through a PWM (Pulse Width Modulation) signal.

A control method of a directional garlic seed throwing mechanism includes following steps.

(1) A seed spacing of garlic sowing is input through a touch display screen 12.

(2) A confirm button is pressed to display a working interface by the touch display screen 12;

(3) The controller 13 reads a speed of the speed sensor 14, and simultaneously calculates a rotating speed and an action time interval of the rotating motor 10 according to the set seed spacing.

(4) In a rotating process of the rotating motor 10, a position sensor 19 detects a position of a bulbil adjusting mechanism 16, wherein when the bulbil adjusting mechanism 16 is detected, the rotating motor 10 stops working, and at this moment, the bulbil adjusting devices for receiving garlic seeds rotate below a vision sensor 1, and the vision sensor 1 acquires garlic seed image information.

(5) The controller 13 analyzes the garlic seed image information, and determines a garlic bulbil direction.

(6) The rotating motor 10 drives the bulbil adjusting devices to rotate.

(7) When the garlic bulbil direction is consistent with a desired direction, electromagnets does not work, and when the garlic bulbil direction is opposite to the desired direction, the controller controls the electromagnets 7 to operate such that the bulbil adjusting devices rotate 180 degrees to complete adjustment of the bulbil direction.

(8) The rotating motor 10 drives the bulbil adjusting devices to rotate to a seed throwing position, and drives the seed containing bowls to tilt under an action of a seed throwing guide plate to enable the garlic seeds to slide into the seed guide pipe 5 under an action of the gravity and then slide into an indenting tool having a duck-bill shape by keeping the bulbil direction upward under the restriction of the seed guide pipe 5, thereby completing directional seed throwing.

During the operation, the directional garlic seed throwing mechanism is mounted below a seed taking mechanism, and the garlic seeds taken out by the seed taking mechanism fall into a first bulbil adjusting mechanism 17. The rotating motor 10 drives the turntable to rotate 45 degrees. The vision sensor 1 acquires image information of the garlic seeds in the first bulbil adjusting mechanism 17, and uploads the image information to the controller 13. Meanwhile, the rotating motor 10 rotates 90 degrees to drive the first bulbil adjusting mechanism 17 to rotate to a position of a third bulbil adjusting mechanism 15. When the bulbil direction needs to be adjusted, the electromagnets 7 act to enable the first bulbil adjusting mechanism 17 to rotate 180 degrees to realize adjustment of the garlic bulbil direction. The rotating motor 10 rotates 90 degrees to drive the first bulbil adjusting mechanism 17 to rotate to a position of a fourth bulbil adjusting mechanism 16. Under the action of the guide plate 11, an upper part of the first bulbil adjusting mechanism 17 tilts, and the baffle plate 4 is opened to enable garlic bulbils to fall into the seed guide pipe 5 in an upward direction to complete directional seed throwing. In this process, the position sensor 19 detects the position of the fourth bulbil adjusting mechanism 16. When the fourth bulbil adjusting mechanism 16 is detected, the-rotating motor 10 stops the action.

Finally, it should be noted that the above is only preferred embodiments of the present disclosure, and is not intended to limit the present disclosure. Although the present disclosure has been described in detail with reference to the foregoing embodiments, those skilled in the art can still modify the technical solutions disclosed in all the foregoing embodiments, or make equivalent substitutions to partial technical features thereof. Any modifications, equivalent substitutions, improvements and the like that are made without departing from the spirit and principle of the present disclosure shall all fall within the protection scope of the present disclosure.

What is claimed is:

1. A directional garlic seed throwing mechanism, comprising: a base, a rotating device, a vision sensor, a seed throwing guide plate, a seed guide pipe and a plurality of bulbil adjusting devices, wherein the rotating device comprises a rotating motor and a turntable; the rotating motor is detachably connected to the base; an output end of the rotating motor is connected with the turntable; an even number of the bulbil adjusting devices are provided and fixedly mounted on the turntable uniformly and symmetrically; the bulbil adjusting devices comprise seed containing bowls and bulbil direction control devices used for driving the seed containing bowls to rotate 180 degrees; an upper port of the seed guide pipe is located right below the bulbil adjusting devices and the seed guide pipe is arranged on the base; and the seed throwing guide plate is arranged on the base, such that garlic seeds in the seed containing bowls fall into the seed guide pipe.

2. The directional garlic seed throwing mechanism according to claim 1, wherein the bulbil direction control device comprises a cam device and a rotary guide device; the cam device comprises a cam, a sliding rod and a roller; a driving end of the sliding rod is provided with the roller that abuts against a curved surface of the cam; a resetting device for driving the roller on the sliding rod to abut against the cam is arranged on a mounting seat; the rotary guide device is arranged on the mounting seat and moves along a curve of a surface of the sliding rod to drive the sliding rod to rotate; one of the seed containing bowls is arranged above the resetting device and connected with the sliding rod; the directional garlic seed throwing mechanism further comprises an electromagnet for enabling operation of the cam device; the electromagnet is detachably connected below a support which is fixedly connected to the base; and a reinforcing plate is arranged between the support and the base.

3. The directional garlic seed throwing mechanism according to claim 2, wherein the rotary guide device comprises a fixed seat, a vertical rod and a cantilever shaft; the fixed seat is detachably connected with the turntable; two ends of the vertical rod are respectively connected with the fixed seat and the cantilever shaft; a bearing is mounted at a tail end of the cantilever shaft, and is matched with a guide groove, along the curve, on the surface of the sliding rod.

4. The directional garlic seed throwing mechanism according to claim 2, wherein the resetting device comprises a pressure spring, a linear bearing and a flange plate; the linear bearing is connected with a fixed seat of the rotary guide device, and is in sliding connection with the sliding rod; the flange plate is arranged at an upper end of the sliding rod and connected with a bottom portion of the one of the seed containing bowls; the pressure spring is disposed about the sliding rod; and one end of the pressure spring is in contact with the flange plate, and the other end of the pressure spring is in contact with the linear bearing.

5. The directional garlic seed throwing mechanism according to claim 2, further comprising a controller, wherein the controller is respectively connected with a touch display screen, the vision sensor, the electromagnets, the rotating motor and a speed sensor.

6. A control method of the directional garlic seed throwing mechanism according to claim 5, comprising following steps:
(1) inputting a seed spacing of garlic sowing through a touch display screen;
(2) pressing a confirm button to display a working interface by the touch display screen;
(3) reading, by the controller, a speed detected by the speed sensor, and simultaneously calculating a rotating speed and an action time interval of the rotating motor according to the set seed spacing;
(4) when the bulbil adjusting devices for receiving garlic seeds rotate to a position below a vision sensor, acquiring, by the vision sensor, garlic seed image information;
(5) analyzing, by the controller, the garlic seed image information, and determining a garlic bulbil direction;
(6) driving, by the rotating motor, the bulbil adjusting devices to rotate;
(7) when the garlic bulbil direction is consistent with a desired direction, the electromagnets does not work, and when the garlic bulbil direction is opposite to the desired direction, controlling, by the controller, the electromagnets to operate such that the bulbil adjusting devices rotate 180 degrees to complete adjustment of the bulbil direction; and
(8) driving, by the rotating motor, the bulbil adjusting devices to rotate to a seed throwing position, and driving the seed containing bowls to tilt under an action of the seed throwing guide plate to enable the garlic seeds to slide into the seed guide pipe under an action of gravity and then slide into an indenting tool having a duck-bill shape by keeping the bulbil direction upward under restriction of the seed guide pipe, and completing directional seed throwing.

7. The directional garlic seed throwing mechanism according to claim 1, wherein the seed throwing guide plate is welded and connected with the base, and a longitudinal central surface of the seed throwing guide plate faces a center of circle of the turntable and is tangential to rotation of the rotating motor.

* * * * *